(12) United States Patent
Pfeiffer et al.

(10) Patent No.: US 10,203,683 B2
(45) Date of Patent: Feb. 12, 2019

(54) COORDINATING END EFFECTOR AND VISION CONTROLS

(71) Applicants: Michael Pfeiffer, Savage, MN (US); Kevin Spiczka, Prior Lake, MN (US)

(72) Inventors: Michael Pfeiffer, Savage, MN (US); Kevin Spiczka, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1135 days.

(21) Appl. No.: 13/942,820

(22) Filed: Jul. 16, 2013

(65) Prior Publication Data
US 2015/0025674 A1  Jan. 22, 2015

(51) Int. Cl.
*G05B 19/401* (2006.01)
*G05B 19/408* (2006.01)

(52) U.S. Cl.
CPC ....... *G05B 19/401* (2013.01); *G05B 19/4086* (2013.01); *G05B 2219/37009* (2013.01)

(58) Field of Classification Search
None
See application file for complete search history.

(56) References Cited

U.S. PATENT DOCUMENTS

| | | |
|---|---|---|
| 5,579,444 A | 11/1996 | Dalziel |
| 6,101,455 A | 8/2000 | Davis |
| 6,591,160 B2 | 8/2003 | Hine |
| 6,681,151 B1 * | 1/2004 | Weinzimmer ........ B25J 9/1697 |
| | | 219/121.85 |
| 6,760,648 B2 | 7/2004 | Sakamoto |
| 6,763,283 B1 | 7/2004 | Murakami |
| 6,931,302 B1 | 8/2005 | Potucek |
| 7,065,892 B2 | 6/2006 | Fleming |
| 7,085,622 B2 | 8/2006 | Sadighi |
| 7,177,459 B1 | 2/2007 | Watanabe |
| 7,250,965 B2 | 7/2007 | Zhang |
| 7,310,439 B2 | 12/2007 | Silverstein |
| 7,430,456 B2 | 9/2008 | Ruden |
| 7,583,835 B2 | 9/2009 | Leroux |
| 7,664,570 B2 | 2/2010 | Suita |
| 7,965,895 B1 | 6/2011 | Danskin |
| 8,082,064 B2 | 12/2011 | Kay |
| 8,135,208 B1 * | 3/2012 | Vangal-Ramamurthy ................... |
| | | G06T 7/0018 |
| | | 348/E17.002 |
| 8,224,607 B2 | 7/2012 | Sakhare |
| 8,242,730 B2 | 8/2012 | Nichols |
| 8,260,461 B2 | 9/2012 | Krishnasamy |
| 8,306,769 B2 | 11/2012 | Wang |
| 8,315,739 B2 | 11/2012 | Dai |
| 8,338,743 B2 | 12/2012 | Wanner |

(Continued)

*Primary Examiner* — Sean Shechtman
(74) *Attorney, Agent, or Firm* — Hall Estill Attorneys at Law

(57) ABSTRACT

An apparatus and associated methodology providing a processor-controlled end effector that is selectively moveable according to end effector coordinates. A camera is positioned to detect objects according to camera coordinates that overlap the end effector coordinates. Logic executes computer instructions stored in memory to obtain a plurality of paired values of end effector coordinates and camera coordinates for each of a plurality of fiducial features, and to derive a transformation function from the plurality of paired values mapping the camera coordinates to the end effector coordinates.

18 Claims, 4 Drawing Sheets

(56) References Cited

U.S. PATENT DOCUMENTS

| | | |
|---|---|---|
| 8,417,318 B2 | 4/2013 | West |
| 8,457,786 B2 | 6/2013 | Andersson |
| 8,457,791 B2 | 6/2013 | Shi |
| 8,473,141 B2 | 6/2013 | Kouno |
| 8,459,922 B2 | 11/2013 | Hosek |
| 9,188,973 B2 * | 11/2015 | Tenney .................. G06T 7/002 |
| 2011/0295408 A1 * | 12/2011 | Burgel ................. G05B 19/401 |
| | | 700/114 |
| 2013/0010081 A1 | 10/2013 | Tenney |
| 2015/0142171 A1 * | 5/2015 | Li ......................... B25J 9/1692 |
| | | 700/251 |

* cited by examiner

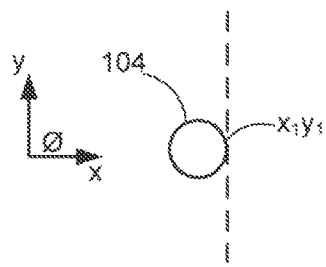
FIG. 5
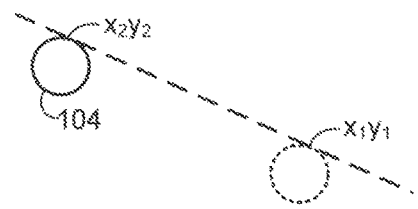
FIG. 6
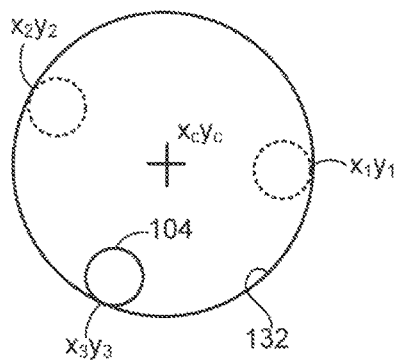
FIG. 7
| Fiducial Feature | Camera X | Camera Y | End Effector X | End Effector Y |
|---|---|---|---|---|
| 132 | 116.69 | 148.70 | 235.11 | 184.25 |
| 134 | 119.33 | 618.88 | 235.00 | 207.31 |
| 136 | 798.18 | 614.55 | 201.06 | 207.18 |
| 138 | 795.33 | 154.75 | 201.07 | 184.17 |
| 140 | 457.06 | 386.45 | 218.06 | 195.66 |
FIG. 8

US 10,203,683 B2

COORDINATING END EFFECTOR AND VISION CONTROLS

SUMMARY

Some embodiments of the described technology contemplate an apparatus having a frame, and a processor-controlled end effector that is selectively moveable to end effector coordinates within a reference plane. A gage is attached to the frame to be immovable along the reference plane. A camera is positioned to detect the gage at camera coordinates of the reference plane. Logic executes computer instructions stored in memory to move the end effector to the gage to define a correspondence between the overlapping end effector coordinates and camera coordinates.

Some embodiments of the described technology contemplate an apparatus having a processor-controlled end effector that is selectively moveable according to end effector coordinates. A camera is positioned to detect objects according to camera coordinates that overlap the end effector coordinates. Logic executes computer instructions stored in memory to obtain a plurality of paired values of end effector coordinates and camera coordinates for each of a plurality of fiducial features, and to derive a transformation function from the plurality of paired values mapping the camera coordinates to the end effector coordinates.

Some embodiments of the described technology contemplate a method including obtaining an apparatus having a processor-controlled end effector that is selectively moveable according to end effector coordinates, and also having a camera positioned to detect objects according to camera coordinates that overlap the end effector coordinates. The method also includes operating the processor to execute computer instructions stored in memory that obtain a plurality of paired values of end effector coordinates and camera coordinates for each of a plurality of fiducial features, and that derive a transformation function from the plurality of paired values mapping the camera coordinates to the end effector coordinates.

BRIEF DESCRIPTION OF THE DRAWINGS

FIG. 5 diagrammatically depicts the end effector detecting first end effector coordinates of a fiducial feature.

FIG. 6 diagrammatically depicts the end effector detecting second end effector coordinates of the fiducial feature of FIG. 5.

FIG. 7 diagrammatically depicts the end effector detecting third end effector coordinates of the fiducial feature of FIG. 5 and calculating center coordinates of the fiducial feature of FIG. 5.

FIG. 8 is tabular data obtained during reduction to practice.

DETAILED DESCRIPTION

Initially, it is to be appreciated that this disclosure is by way of example only, not by limitation. The automation concepts herein are not limited to use or application with any specific system or method that controls the movements and placements of a workpiece or a tool via a processor-based controller. Thus, although the instrumentalities described herein are for the convenience of explanation, shown and described with respect to exemplary embodiments, it will be appreciated that the principles herein may be applied equally in other types of systems and methods employing a processor-based controller.

Figure 1:
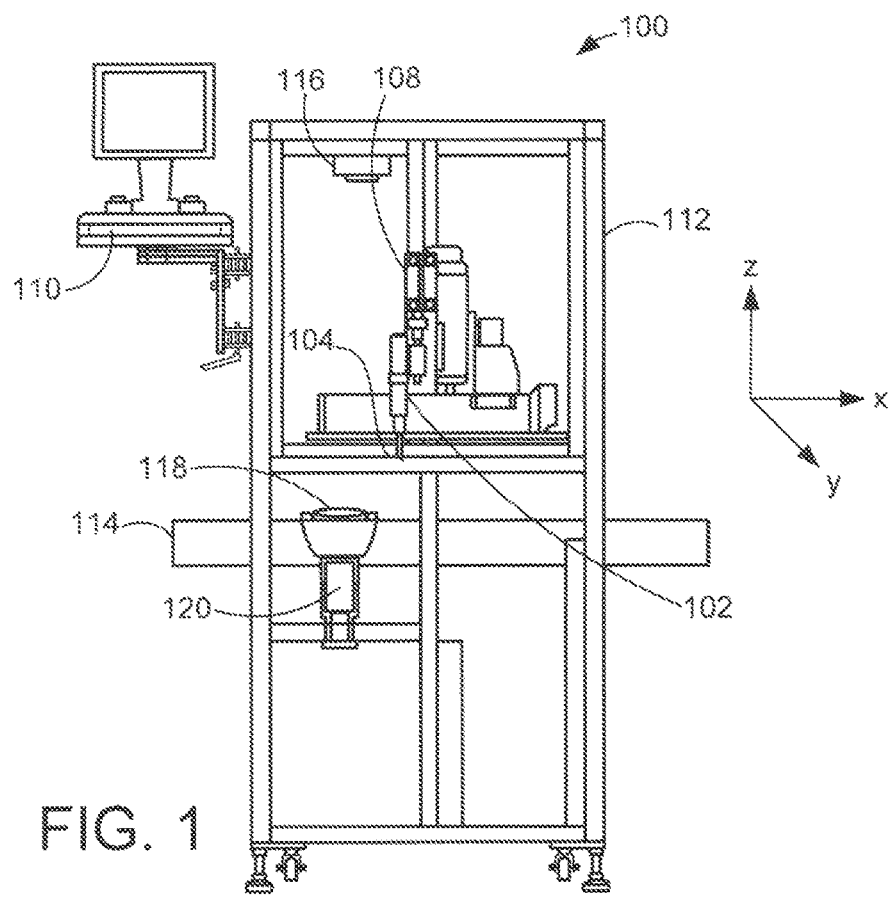
FIG. 1 is a diagrammatic depiction of an automated manufacturing cell that is constructed in accordance with embodiments of the present invention.

Turning first to FIG. 1 which diagrammatically depicts an automated manufacturing cell 100 that is constructed in accordance with illustrative embodiments of the present invention. The illustrative cell 100 generally depicts a pick-and-place station in a manufacturing line. However, the embodiments depicted by FIG. 1 and those that follow are merely illustrative and not limiting of the contemplated embodiments of the claimed invention.

The cell 100 generally controls an end effector 102 that loads a selected tool 104, such as from a turret loaded with different tools, to perform manufacturing and/or assembly operations on a work article in the cell 100. A multi-axis positioner 108 guides the end effector 102. The positioner 108 is equipped with positional control, such as linear encoders, so that a processor-based control system 110 can move the end effector 102 to target locations. For example, the control system 110 can pick a component of assembly at a first target location and place the component of assembly at a second target location. For purposes of this illustrative description it will be understood that the end effector 102 is programmably moved between target locations with respect to a horizontal reference plane; along the X-Y axes directions. The end effector 102 is also programmably moved in directions orthogonal to the reference plane; in the Z axis direction. In alternative equivalent embodiments the end effector can be moved according to one or more rotational axes as well.

The cell 100 is illustrative of a modular approach wherein a plurality of such cells is joined together to form a manufacturing line, although the present embodiments are not so limited. Particularly, the cell 100 is built upon the frame 112 having rollers to facilitate moving cells into and out of a manufacturing line, or to rearrange the cells as is desired for running different articles down the manufacturing line. Support mounts are extendible to operably lift the frame 112 off the rollers and to level the frame 112. A conveyor section 114 can be included at a standardized elevation in each of adjacent cells to provide a continuous transport system for presenting the work articles for processing in each of the respective cells. A pallet (not shown) supporting the work article in its various stages of manufacture is typically transported down the conveyor 114.

The control system 110 maintains positional control of the end effector 102 by continuous positional feedback, such as from linear encoders aligned with end effector movements in each of the X, Y, and Z axes. Thus, the control system 110 moves the end effector 102 to a target location by sending a command to move according to end effector coordinates in the reference plane. Further, a vision control system includes a camera 116 mounted such that it provides a visual detection of objects according to camera coordinates in the reference plane. The control system 110 is thus capable of detecting the target location via the camera coordinates, and then move the article to the target location via the end effector coordinates. An advantage of some embodiments of the present technology is that control according to the end effector coordinates closely corresponds to control according to the overlapping camera coordinates.

For purposes of teaching that coordinate correspondence to the control system 110 in accordance with the presently disclosed technology, a gage 118 is mounted to the frame 112 and within reach of the end effector 102 in the X-Y reference plane. In this description "teaching" and "teaching cycle" means a computer process by which the control system 110 performs operations with the end effector 102 and the camera 116 to define a locational correspondence between the end effector coordinates 124 and the camera coordinates 126 in the reference plane 122. For compact construction the gage 118 is advantageously supported upon an extensible actuator 120 so that it is selectively moveable in the Z axis direction between an extended mode as depicted in FIG. 1 for use during a teaching cycle. Between teaching cycles the actuator 120 can retract the gage 118 beneath the rollers of the conveyor 114 for unobtrusive storage during a cell 100 production cycle.

In these depicted embodiments the gage 118 is immovable in the directions of the X-Y reference plane between teaching cycles, so that when extended the gage 118 returns to the same reference plane coordinates independent of any control or movement by either the end effector 102 or the camera 116. This completely removes the end effector 102 and the camera 116 as sources of process variation with respect to the gage 118 positioning, permitting a direct measurement of the camera's 116 precision. For example, any part-to-part variation by the camera 116 in detecting the location of a fiducial feature of the gage 118 is attributable to camera 116 error. The error in that case is either camera 116 detection error or the camera 116 is moving between teaching cycles.

Although in the disclosed embodiments the gage 118 is intentionally immovable along directions of the reference XY plane, the contemplated embodiments are not so limited. In alternative embodiments a gage may be immovable in all directions or may be movable in directions of the XY plane and yet similarly employed to define the close correspondence of the end effector coordinates and the camera coordinates. To reiterate, the depicted embodiments advantageously permit a compact construction and reduced process variation.

For purposes of this description, the term "fiducial feature" means a fixed reference surface used for purposes of comparison. That is, a fiducial feature of the gage 118 is a reference feature intended for use in teaching the correspondence of the end effector coordinates and the camera coordinates.

Figure 2:
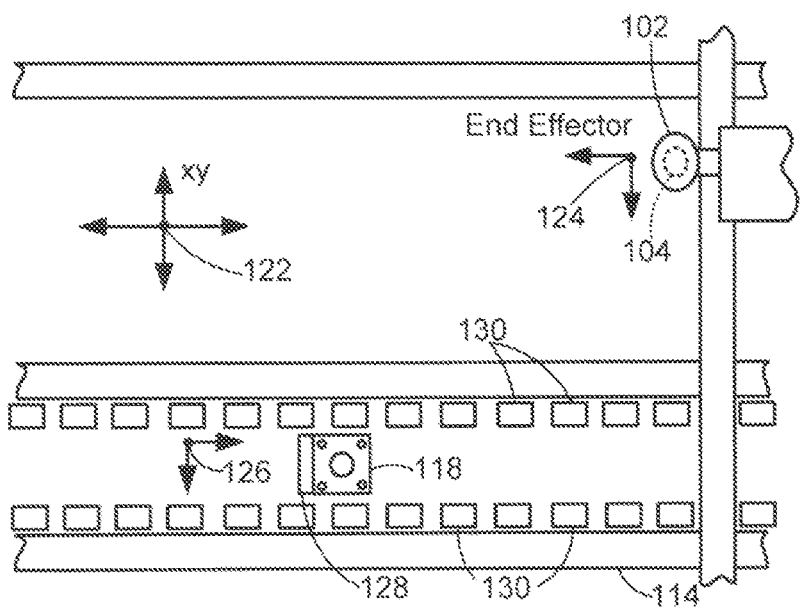
FIG. 2 is a diagrammatic depiction of a plan view of a portion of the cell of FIG. 1 showing the XY reference plane.

FIG. 2 diagrammatically depicts the X-Y reference plane 122 as viewed by the camera 116 (FIG. 1). The control system 110 moves the end effector 102 according to end effector coordinates 124 within the reference plane 122, and the camera detects objects such as movements of the end effector 102 according to camera coordinates 126 also within the reference plane 122. The gage 118 is depicted as mounted to the frame 112 (FIG. 1) by a bracket 128 coupled to the actuator 120 (FIG. 1) and between opposing rollers 130 of the conveyor 114. In the retracted position the gage 118 is unobtrusively tucked away beneath the rollers 130, and in the extended position the gage 118 is presented within the operable range of the end effector 102 in the X-Y reference plane, and within the focal range of the camera 116.

Figure 3:
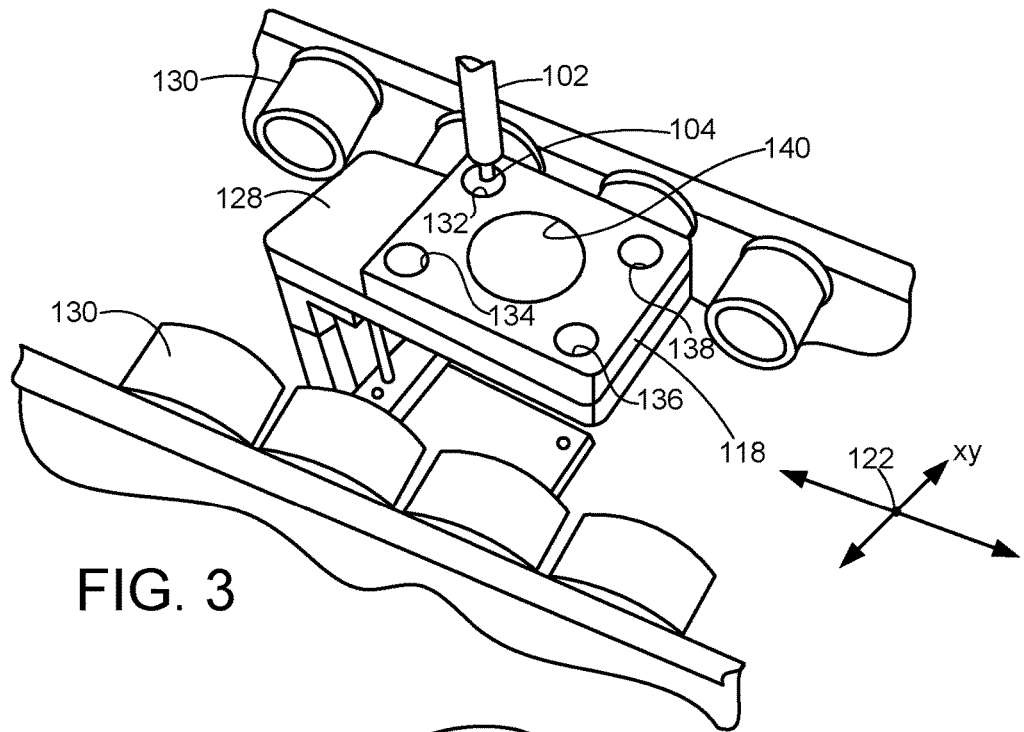
FIG. 3 is an enlarged isometric depiction of a portion of FIG. 2.

FIG. 3 is an enlarged isometric depiction of a part of the reference plane of FIG. 2 with the gage 118 in the raised position for use during a teaching cycle. In these illustrative embodiments the gage 118 has five fiducial features; four smaller circular openings 132, 134, 136, 138 in a square pattern and surrounding a larger circular opening 140. The end effector 102 has obtained the selected tool 104, which in these illustrative embodiments is an electrical continuity probe although the contemplated embodiments are not so limited. The end effector 102 imparts a test voltage to the tool 104 during a teaching cycle. By constructing the gage 118 of an electrically conductive material, such as steel, the tool 104 in conjunction with current sense circuitry can detect the surface of the gage 118 precisely at the end effector coordinates where electrical continuity occurs instantaneously as a result of physical contact between the tool 104 and the gage 118. The end effector 102 provides a digital signal to the control system 110 corresponding to the occurrence of electrical continuity, indicating when the surface of the gage 118 is detected.

Figure 4:
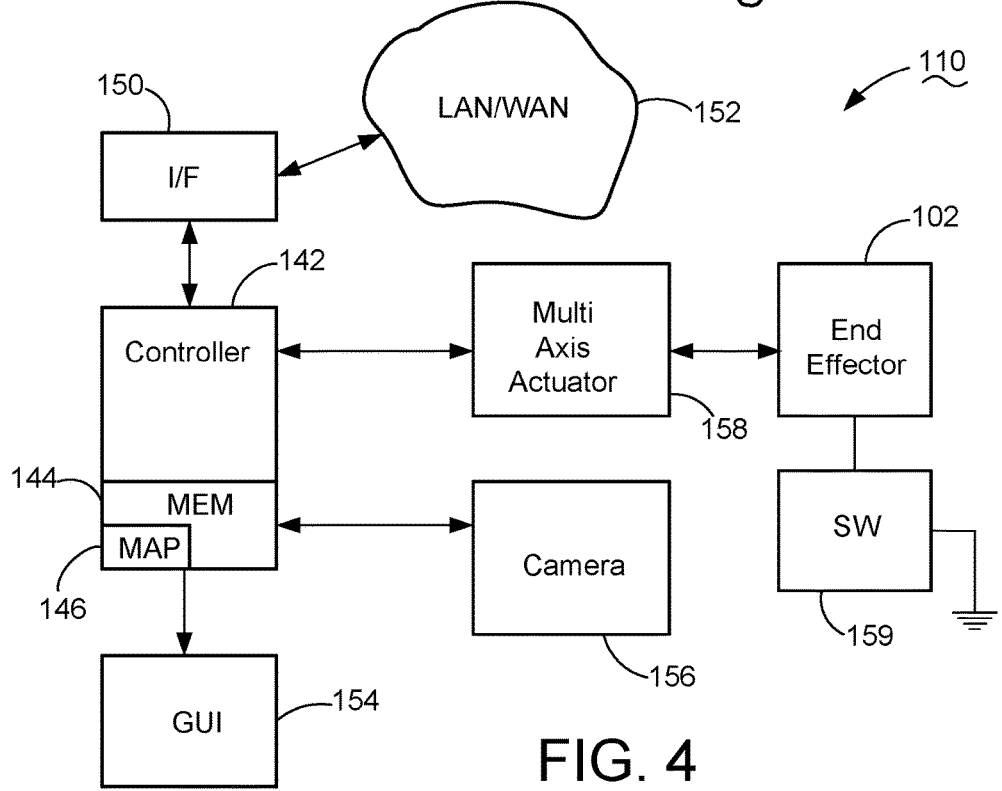
FIG. 4 is a functional block depiction of the control system of the cell in FIG. 1.

FIG. 4 is a functional block depiction of the control system 110. A processor-based controller 142 provides top level control of the cell 100 using programming instructions and data stored in memory (MEM) 144. A mapping module 146 is an application-specific set of programming instructions that when executed provides logic that moves the end effector 102, obtains and stores data, and processes the data to perform the operating principles of the present embodiments as described herein.

A network interface (I/F) block 150 facilitates communication of the controller 142 via a computer network 152. A graphical user interface (GUI) 154 facilitates user input and displays data and results in human readable form, such as via a computer keyboard and monitor as depicted in FIG. 1.

A camera control block 156 provides control and interface circuitry for the camera 116. A multiple axis actuator block 158 contains driver circuitry that receives control inputs from the controller 142 to provide corresponding control signals to an actuator assembly for moving the end effector 102 within the X, Y, Z coordinate space. The actuators can include linear sliders with encoder feedback to the controller 142 to permit controlled movement of the end effector 102.

Use of the end effector 102 during a production cycle can require the tool to be electrically grounded, such as to prevent an electrostatic discharge that can damage components of assembly. For this dual purpose of the end effector 102 the control system 110 includes a switching mechanism 159, such as a relay, that in one state enables the end effector 102 to electrically charge the tool 104 for the continuity detection (during the teaching cycle) while in the opposing state electrically grounds the end effector 102 (during the production cycle).

FIGS. 5-7 diagrammatically depict steps performed by executing the MAP 146 logic (FIG. 4) to move the end effector 102 in order to locate end effector coordinates for each of the plurality of fiducial features 132-140. The MAP 146 logic then pairs the end effector coordinates with the camera coordinates for each of the plurality of fiducial features, and maps the camera coordinates to the end effector coordinates in relation to the values of the paired coordinates.

Executing the MAP 146 logic first activates the switch 159 (FIG. 4) and imparts a test voltage to the tool 104 for continuity detection. The MAP 146 logic then can proceed to detect the center coordinates of each fiducial feature 132-140 (FIG. 3). For example, in FIG. 5 the tool 104 is moved to enter the opening of the fiducial feature 132, and is then moved along the X,Y reference plane a selected direction Ø until the gage 118 surface is detected at end effector coordinates $X_1Y_1$. To improve sampling, the tool 102 entry point is preferably about the center of the opening, although not necessarily so. The approximate center can be programmed, or the last calculated center can be stored and recalled from MEM 144 for a subsequent teaching cycle. The first direction of movement Ø is arbitrary, in this illustrative case the move is at about 180 degrees according to the end effector coordinates 124 (FIG. 2).

FIG. 7 similarly depicts the tool 104 having been moved in a third angular direction to identify the end effector coordinates of a third point $X_3Y_3$ defining the fiducial feature 132. The MAP 146 can then calculate, from the three surface points at end effector coordinates $X_1Y_1$, $X_2Y_2$, $X_3$, $Y_3$, the end effector coordinates $X_C$, $Y_C$ of the center of the fiducial feature 132.

Although the depicted embodiments discloses calculating the center coordinates from the detection of three surface points, the contemplated embodiments are not so limited. In alternative equivalent embodiments more than three points can be detected and used in the same manner. The use of more data points increases the accuracy of the center point calculation, at the penalty of longer teaching cycle time.

The MAP 146 further calculates, from the pixel discrimination of the camera 116, the surface defining the fiducial feature 132. Accuracy of the camera 116 detection can be enhanced by blackening the bores in the gage 118 and polishing the top surface of the gage 118, thus maximizing the visual contrast demarcating the edge of the surface defining the opening. From having detected that circular surface via the camera coordinates, the MAP 146 then calculates the camera coordinates $X_C$, $Y_C$ for the same center of the fiducial feature 132. This procedure is repeated for each of the other four fiducial features 134-140 to obtain the end effector coordinates and the camera coordinates for the center of each of the five fiducial features 132-140. Illustrative data that was obtained during reduction to practice is depicted in FIG. 8 as tabular data that can be stored as such in the MEM 144.

The MAP 146 processes the paired data values such as by performing a minimum mean square error (MMSE) estimator function to derive a transformation function that maps the camera values to the corresponding end effector values. During reduction to practice the five paired data values in FIG. 8 were computed by an MMSE estimator function in terms of six degrees of freedom; X translation, Y translation, scaling, aspect ratio, rotation, and skew. The calculated transformation constant values obtained were as follows:

Translation X: 4798.37
Translation Y: −3533.91
Scaling: 19.9658
Aspect Ratio: 0.999974 (Y/X)
Rotation: 179.828 (deg)
Skew: 179.987

In these illustrative embodiments the derived MMSE transformation function in terms of the degrees of freedom is the following:

$$\begin{bmatrix} X_{end\ effector} \\ Y_{end\ effector} \end{bmatrix} = \begin{bmatrix} \cos\theta \sin\theta \\ -\sin\theta \cos\theta \end{bmatrix} \begin{bmatrix} \dfrac{X_{camera} - Translation_X}{Scaling * Aspect\ Ratio} \\ \dfrac{Y_{camera} - Translation_Y}{Scaling \div Aspect\ Ratio} \end{bmatrix} \quad (1)$$

The MAP 146 stores the transformation function in memory in order to map camera coordinates to corresponding end effector coordinates. For example, a feature detected by the camera at coordinates $X_{camera}=333$ and $Y_{camera}=555$, input to the transformation function in these illustrative embodiments maps to end effector coordinates $X_{end\ effector}=224.27$, $Y_{end\ effector}=204.12$:

$$\begin{bmatrix} \cos(179.8)\sin(179.8) \\ -\sin(179.8)\cos(179.8) \end{bmatrix} \begin{bmatrix} \dfrac{(333 - 4798.37)}{19.9658 * 0.999974} \\ \dfrac{(555 - 3533.91)}{19.9658 \div 0.999974} \end{bmatrix} = \begin{bmatrix} 224.27 \\ 204.12 \end{bmatrix} \quad (2)$$

Figure 9:
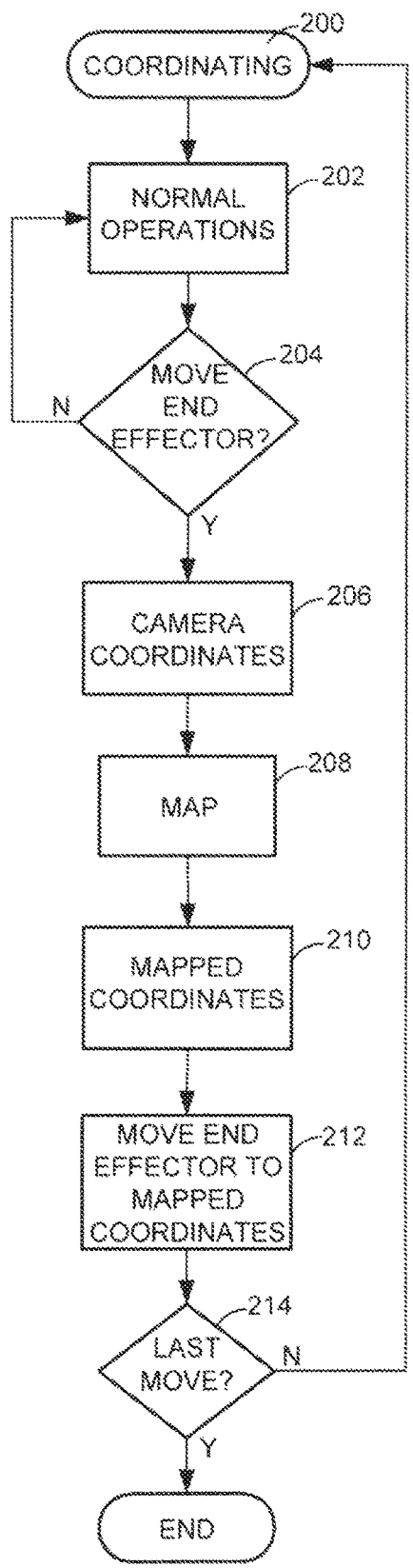
FIG. 9 is a flowchart of steps in a method of COORDINATING in accordance with embodiments of the present invention.

FIG. 9 is a flowchart depicting steps in a method 200 of COORDINATING in accordance with embodiments of the present invention. The method 200 is implemented by the controller 142 during normal operations in block 202 when the occasion arises in block 204 that an end effector move is necessary. In block 206 the controller obtains the camera coordinates for the target location, such as the target coordinates $X_{camera}=333$, $Y_{camera}=555$ to continue the example above. The camera coordinates are input to the stored transformation function in block 208 to obtain the mapped end effector coordinates in block 210. In the illustrative example, equation (2) shows the mapped end effector coordinates are $X_{mapped}=224.27$, $Y_{mapped}=204.12$. In block 212 the controller 142 commands the end effector 102 to move to the mapped end effector coordinates. If the determination of block 214 is "no," then control returns to block 200; else the method ends.

Summarizing, the described technology advantageously provides a close correspondence between where the control system sees an object via its vision control system and where the control system picks and places in relation to the seen object via its end effector control system. Principally, the described technology contemplates the apparatus having the processor-controlled end effector that is selectively moveable according to end effector coordinates. The camera is positioned to detect objects according to camera coordinates that overlap the end effector coordinates. Logic executes computer instructions stored in memory to obtain a plurality of paired values of end effector coordinates and camera coordinates for each of a plurality of fiducial features, and to derive a transformation function from the plurality of paired values mapping the camera coordinates to the end effector coordinates.

The close correspondence of the two overlapping coordinates is maximized by teaching the correspondence to the control system by use of a gage that is immovable in the reference plane containing both coordinates. To that end the described technology contemplates the apparatus having the frame, and the processor-controlled end effector that is selectively moveable to end effector coordinates within the reference plane. The gage is attached to the frame to be immovable along the reference plane. The camera is positioned to detect the gage at camera coordinates of the reference plane. Logic executes computer instructions stored in memory to move the end effector to the gage to define the correspondence between the overlapping end effector coordinates and camera coordinates.

It is to be understood that even though numerous characteristics and advantages of various embodiments of the described technology have been set forth in the foregoing description, together with the details of the structure and function of various embodiments of the invention, this disclosure is illustrative only, and changes may be made in detail, especially in matters of structure and arrangement of parts within the principles of the described technology to the full extent indicated by the broad general meaning of the terms in which the appended claims are expressed. For example, other machine components and various arrangements thereof than the pick-and-place cell described are contemplated while still maintaining substantially the same functionality without departing from the scope and spirit of the claimed invention. Further, although the illustrative embodiments described herein are directed to automated manufacturing cells, and related technology, it will be appreciated by those skilled in the art that the claimed invention can be applied to other devices employing a processor-based controller as well without departing from the spirit and scope of the described technology.

What is claimed is:

1. An apparatus comprising:
a gage defining a fiducial feature in a reference plane;
an end effector configured to locate the fiducial feature with respect to end effector coordinates of the reference plane;
a camera configured to locate the fiducial feature with respect to camera coordinates of the reference plane that are different than the end effector coordinates of the reference plane; and
a processor executing computer logic stored in memory that is configured to move the end effector to pair the end effector coordinates and the camera coordinates for each of a plurality of fiducial features, and to perform a minimum mean square error estimation for the plurality of paired values to derive a transformation function mapping the camera coordinates to the end effector coordinates.

2. The apparatus of claim 1 wherein the gage is supported by an actuator configured to selectively move the gage in directions orthogonal to the reference plane.

3. The apparatus of claim 1 wherein the computer logic operably activates a switch to selectively ground the end effector.

4. The apparatus of claim 3 wherein the computer logic operably detects a surface of the gage in response to receiving an electrical continuity signal from the end effector.

5. The apparatus of claim 1 wherein the computer logic operably locates a plurality of fiducial features of the gage with the end effector and with the camera.

6. The apparatus of claim 1 wherein the computer logic stores the transformation function in the memory.

7. The apparatus of claim 1 wherein the logic operably identifies a target location with respect to target camera coordinates of the reference plane, inputs the target camera coordinates to the transformation function to calculate mapped end effector coordinates of the reference plane, and moves the end effector to the target location by commanding the end effector to move to the mapped end effector coordinates.

8. The apparatus of claim 1 wherein at least one of the plurality of fiducial features is a circular opening in a gage, and wherein the logic operably calculates coordinates of a center of the circular opening.

9. The apparatus of claim 8 wherein the computer logic operably detects a plurality of points on the surface defining the circular opening, and from the plurality of points calculates the center of the opening.

10. The apparatus of claim 8 comprising a gage defining the plurality of fiducial features that is stationary in directions parallel to the reference plane.

11. A method comprising:
obtaining an apparatus having a gage defining a fiducial feature in a reference plane, a selectively moveable end effector configured to locate the fiducial feature with respect to end effector coordinates of the reference plane, and also having a camera configured to locate the fiducial feature with respect to camera coordinates of the reference plane that are different than the end effector coordinates of the reference plane; and
operating a processor to execute computer instructions stored in memory that are configured to move the end effector to pair the end effector coordinates and the camera coordinates for each of a plurality of fiducial features, and further configured to perform a minimum mean square error estimation for the plurality of paired values to derive a transformation function mapping the camera coordinates to the end effector coordinates.

12. The method of claim 11 further comprising moving the gage orthogonally to the reference plane.

13. The method of claim 11 further comprising electrically grounding the end effector.

14. The method of claim 13 further comprising receiving an electrical continuity signal when the end effector detects a surface of the gage.

15. The method of claim 11 further comprising locating a plurality of fiducial features of the gage with the end effector and with the camera.

16. The method of claim 11 wherein the fiducial feature is a circular opening, and further comprising detecting a plurality of points on the surface of the gage defining the circular opening and calculating the center of the circular opening from the detected points.

17. The method of claim 11 further comprising storing the transformation function in the memory.

18. The method of claim 11 further comprising identifying a target location via target camera coordinates, inputting the target coordinates to the transformation function to calculate the mapped end effector coordinates, and moving the end effector to the mapped end effector coordinates.

* * * * *